US012487561B2

(12) United States Patent
Christan

(10) Patent No.: US 12,487,561 B2
(45) Date of Patent: Dec. 2, 2025

(54) BOLT INTENDED TO LIMIT THE AXIAL TRAVEL OF A MOVING BODY OF A HOROLOGICAL MOVEMENT AND HOROLOGICAL MOVEMENT INCLUDING THE SAME

(71) Applicant: ETA SA MANUFACTURE HORLOGÈRE SUISSE, Grenchen (CH)

(72) Inventor: Julien Christan, Bienne (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 582 days.

(21) Appl. No.: 17/960,562

(22) Filed: Oct. 5, 2022

(65) Prior Publication Data

US 2023/0176523 A1 Jun. 8, 2023

(30) Foreign Application Priority Data

Dec. 7, 2021 (EP) .................................... 21212894

(51) Int. Cl.
*G04B 19/14* (2006.01)

(52) U.S. Cl.
CPC .................................... *G04B 19/14* (2013.01)

(58) Field of Classification Search
CPC ...................................................... G04B 19/14
See application file for complete search history.

(56) References Cited

U.S. PATENT DOCUMENTS 1,400,421 A * 12/1921 Colomb ................. G04B 19/14 968/157
3,523,417 A * 8/1970 Katsuhiko ............. G04B 19/14 968/157
4,183,204 A * 1/1980 Sauter .................... G04B 37/04 968/307
4,213,295 A 7/1980 Perrot
5,699,324 A * 12/1997 Perrot .................... G04B 19/14 368/294
11,829,109 B2 * 11/2023 Kaelin ................... G04B 19/14
12,248,278 B2 * 3/2025 Wyssbrod .............. G04B 19/14
2016/0274545 A1 9/2016 Humair et al.
2021/0165369 A1 * 6/2021 Kaelin ................... G04B 19/14

FOREIGN PATENT DOCUMENTS

CH 716 943 A2 6/2021
EP 3 070 345 A1 9/2016
JP 52-9356 A 1/1977
JP 2016-173362 A 9/2016

OTHER PUBLICATIONS

European Search Report for EP 21 21 2894 dated Apr. 28, 2022.

* cited by examiner

*Primary Examiner* — Edwin A. Leon
*Assistant Examiner* — Jason M Collins
(74) *Attorney, Agent, or Firm* — Sughrue Mion, PLLC

(57) ABSTRACT

A bolt (10) configured to limit the axial travel of a moving body (21) of a horological movement (20). The bolt includes a head (11) arranged at the end of an arbor (12) extending according to a longitudinal axis of revolution, the head (11) extending radially with respect to the arbor (12) and including over a portion of its periphery, a radial addendum (110) configured to be arranged opposite said moving body (21), and including, at the interface with the arbor (12), a bearing base (111) through which the bolt (10) is configured to rest against a structure (22) of the horological movement (20).

11 Claims, 2 Drawing Sheets

BOLT INTENDED TO LIMIT THE AXIAL TRAVEL OF A MOVING BODY OF A HOROLOGICAL MOVEMENT AND HOROLOGICAL MOVEMENT INCLUDING THE SAME

CROSS-REFERENCE TO RELATED APPLICATIONS

This application claims priority to European Patent Application No. 21212894.6 filed Dec. 7, 2021, the entire contents of which are incorporated herein by reference.

TECHNICAL FIELD OF THE INVENTION

The invention relates to the watchmaking field, and relates more particularly to a bolt intended to limit the axial travel of a moving body of a horological movement.

In a particularly advantageous application of the present invention, the moving body consists of an hour wheel.

TECHNOLOGICAL BACKGROUND

In a horological movement of a timepiece, the height shake, i.e. the axial travel, of a moving body, for example of a wheel, is generally limited by the dial or by a structure element of the horological movement, such as a cock or a plate.

More particularly, in the case of a moving body formed by the hour wheel, the axial travel is generally limited by the dial, or else when the timepiece does not include any dial, for example in the case of a watch called “skeleton watch”, the axial travel of the hour wheel is limited by the minute cock.

Although they are generally satisfactory in forming axial stops of the moving body, these solutions require carrying out relatively long and tedious manipulations to remove the wheel off the horological movement, for example during maintenance operations. Indeed, it is then necessary, at first, to remove the dial or the structure element in order to be able to remove said moving body later on.

Furthermore, these solutions could generate difficulties in the control of mechanical clearances, and more particularly the control of the value of the limit of the authorised axial travel of the moving body, because of possible dimensional uncertainties or of possible deformations of the dial or of the structure element.

SUMMARY OF THE INVENTION

The invention solves the aforementioned drawbacks by proposing a solution allowing axially holding a moving body in a horological movement while facilitating a possible operation of removing said moving body.

Another objective of the invention is to contribute to the control of the value of the limit of the authorised axial travel of the moving body.

To this end, the present invention relates to a bolt intended to limit the axial travel of a moving body of a horological movement, said bolt including a head arranged at the end of an arbor extending according to a longitudinal axis of revolution.

Said head extends radially with respect to the arbor and includes over a portion of its periphery, a radial addendum intended to be arranged opposite said moving body. The head further includes, at the junction with the arbor, a bearing base through which the bolt is intended to rest against a structure of the horological movement.

In particular embodiments, the invention may further include one or more of the following features, considered separately or according to any technically-feasible combination.

In particular embodiments, the base has a central over-thickness extending around the arbor so as to allow limiting the bearing surface of said base on the structure of the horological movement.

In particular embodiments, the head includes a relief adapted to cooperate with a tool so as to subject said head to a force moment about the longitudinal axis of the arbor.

In particular embodiments, the arbor includes an annular groove contiguous to the head.

In particular embodiments, the arbor includes an annular boss.

In particular embodiments, the radial addendum includes a chamfer or a fillet intended to face the moving body.

In particular embodiments, the head includes a planar surface parallel to the longitudinal axis of the arbor, intended to be arranged bearing against a bearing surface of the structure of the horological movement.

In particular embodiments, the free end of the arbor includes a chamfer.

According to another object of the present invention, the present invention also relates to a horological movement comprising a moving body arranged on a structure of said horological movement, said structure comprising a housing in which a bolt as previously described is fitted.

The bolt is fitted into the housing so as to be movable in rotation about the longitudinal axis of the arbor, between a position called “unlocking position”, in which the radial addendum is set back with respect to the moving body, and a position, called “blocking position”, in which the radial addendum faces the moving body.

In particular embodiments, the bolt is configured so that, when it is arranged in the blocking position, the radial addendum is arranged at a distance from the moving body.

In particular embodiments, the structure comprises at least two housings distributed around the moving body, in each of which a bolt is fitted.

BRIEF DESCRIPTION OF THE FIGURES

Other features and advantages of the invention will appear upon reading the following detailed description given as a non-limiting example, with reference to the appended drawings in which.

DETAILED DESCRIPTION OF THE INVENTION

Figure 1:
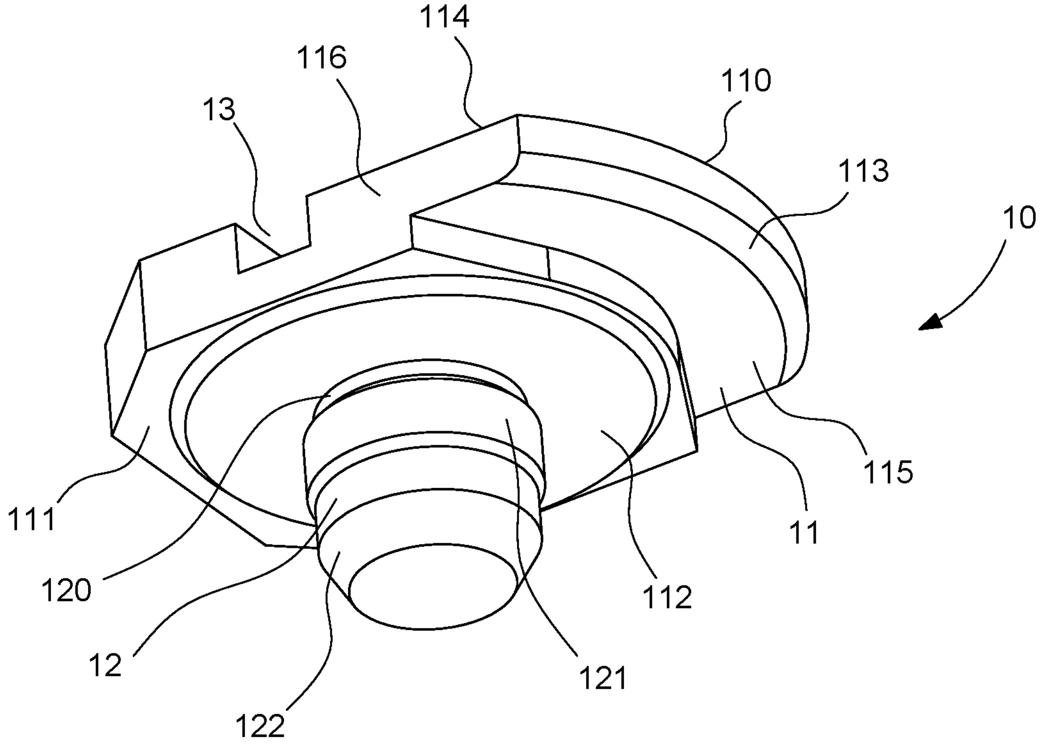
FIG. 1 represents a perspective bottom view of a bolt according to a preferred embodiment of the invention.

FIG. 1 shows a bolt 10 intended to limit the axial travel of a moving body 21 of a horological movement 20. Such a moving body 21 may consist of an hour wheel, a date disc, a lunar phase disc, etc.

Figure 4:
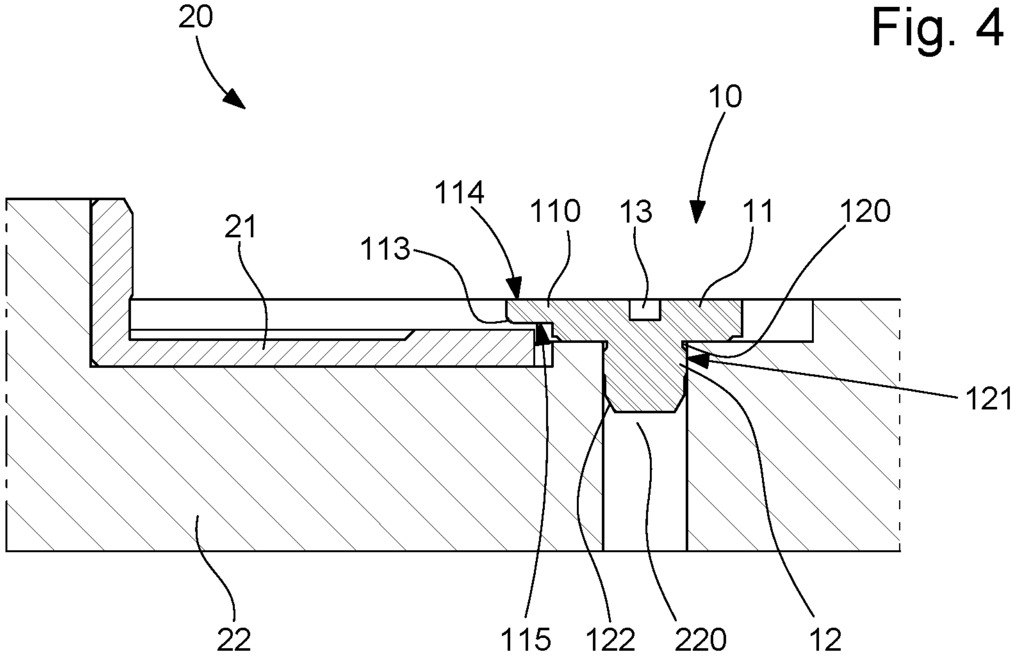
FIG. 4 represents a cross-sectional view of a bolt according to FIG. 1 fastened to a horological movement according to FIG. 3.

The moving body 21 is arranged on a structure 22 of the horological movement 20 which comprises at least one housing 220 in which a bolt 10 is intended to be fitted so as to be movable in rotation, as shown in the sectional view of FIG. 4.

The bolt 10 includes a head 11 arranged at the end of an arbor 12 extending according to a longitudinal axis of revolution. The arbor 12 is driven into the housing 220 of the structure 22 of the horological movement 20 and the head 11 is arranged in abutment against said structure 22.

The arbor 12 has an axisymmetric shape so as to be able to be pivoted about its longitudinal axis, relative to the structure 22 of the horological movement 20 between a blocking position of the moving body 21 and an unlocking position of the moving body 21 described in detail hereinafter.

Figure 3:
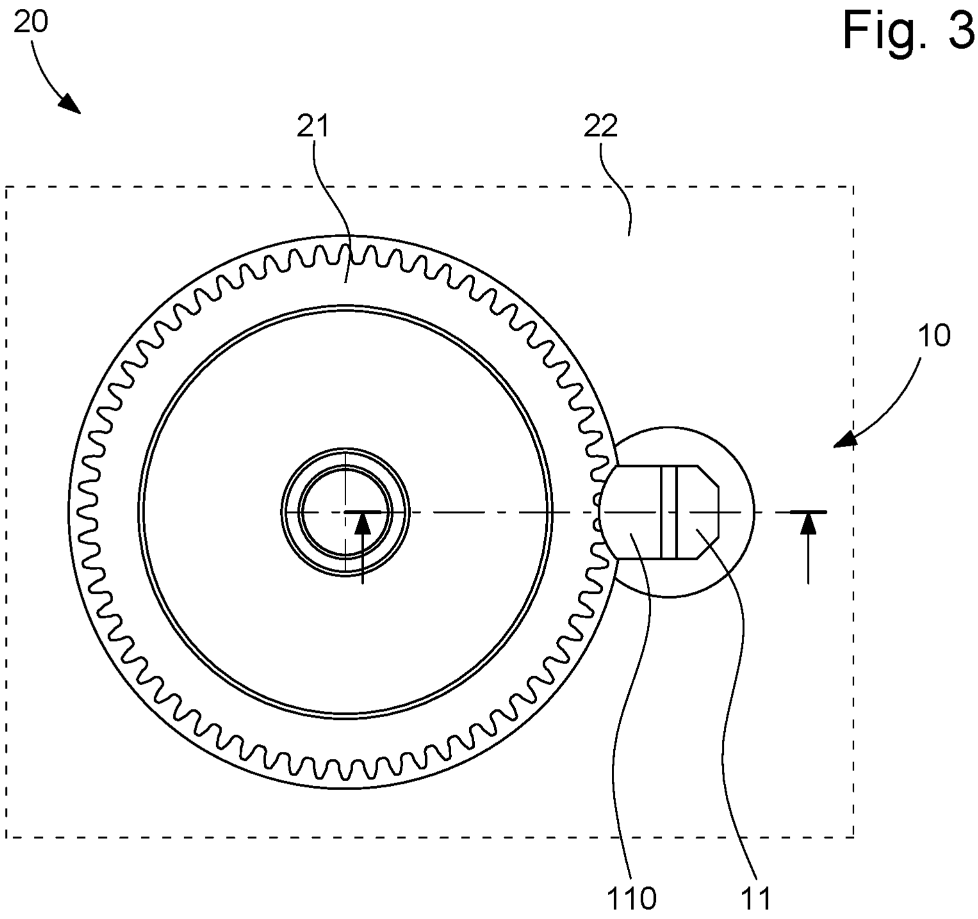
FIG. 3 represents a top view of a portion of a horological movement including a bolt according to FIG. 1.

The head 11 extends radially around the arbor 12 and includes over a portion of its periphery, a radial addendum 110. The radial addendum 110 is intended to be arranged opposite the moving body 21, when the bolt 10 occupies the blocking position, as shown in FIGS. 3 and 4, so as to form a possible stop.

More particularly, as shown in FIG. 4, the bolt 10 is configured so that, when it is arranged in the blocking position, the radial addendum 110 is arranged at a distance from the wheel 21 so as to generate no friction during the rotation of the latter.

As a non-limiting example, when the bolt 10 is in the blocking position, the lower surface 115 of the radial addendum 110 is arranged at a few tens or hundreds of millimetres from the moving body 21.

The bolt 10 is configured so that, when it occupies the unlocking position, the radial addendum 110 is set back with respect to the moving body 21 so as not to form an obstacle during a possible axial movement of the latter.

The head 11 further includes, at the junction with the arbor 12, a bearing base 111 through which the bolt 10 is intended to rest against the structure 22 of the horological movement 20. As shown in FIGS. 1 and 4, the radial addendum 110 extends radially beyond the base 111.

As shown in particular in FIG. 1, the base 111 may advantageously have a central overthickness 112 extending around the arbor 12. The overthickness 12 is intended to form an axial shoulder of the bolt 10 through which it bears against the structure 22 of the horological movement 20.

The overthickness 112 has an axisymmetric substantially cylindrical shape whose axis is coincident with the longitudinal axis of the arbor 12 and comprises a cross-section whose radial dimension is reduced in comparison with that of the base 111 so as to limit the bearing surface of said base 111 on the structure 22 of the horological movement 20. Thus, the overthickness 112 allows reducing frictions during pivoting of the bolt 10 to facilitate the rotational drive of the bolt 10. The overthickness 112 also has the advantage of avoiding damaging the structure 22 of the horological movement 20 during the rotation of the bolt 10, to the extent that it avoids any contact between said structure 22 and a possible edge or a possible sharp angle of the head 11 during the movement of the bolt 10.

To be able to be driven in rotation, the head 11 may include a relief 13 adapted to cooperate with a tool so as to subject said head 11 to a force moment about the longitudinal axis of the arbor 12.

In the preferred embodiment represented in FIGS. 1 to 4, the relief 13 is formed by a slot intended to cooperate with a blade of a flat screwdriver. The relief 13 is formed on an upper surface 114 of the head 11, opposite to a lower surface 115 intended to be oriented towards the structure 22 of the horological movement 20.

The radial addendum 110 extends radially up to a free end and includes, between said free end and a surface corresponding to the lower surface 115 of the head 11, a chamfer or a fillet 113 intended to be arranged opposite the moving body 21 when the bolt 10 is in the blocking position. This feature allows eliminating any edge or sharp angle likely to damage the moving body 21 when the bolt 10 is driven in rotation between the blocking and unlocking positions.

Advantageously, the head 11 may include at least one planar surface 116 parallel to the longitudinal axis of the arbor 12, intended to be arranged bearing against a bearing surface (not represented in the figures) of the structure 22 when said bolt 10 occupies the unlocking position or the blocking position.

Preferably, as illustrated in FIGS. 1 to 4, the head 11 includes two parallel opposed planar surfaces 116 forming sidewalls of said head 11. Thus, the unlocking position or the blocking position may correspond to either one of two angular positions reached when pivoting the bolt 10 in either direction of rotation until either one of the planar surfaces 116 abuts against a bearing surface of the structure 22 of the horological movement 20 provided to this end.

Preferably and advantageously, the arbor 12 includes an annular groove 120 contiguous to the head 11. This groove 120 allows accommodating possible burrs of the structure 22 of the horological movement 20 or possible chips of material generated when fitting the arbor 12 into the structure 22 of the horological movement 20.

Figure 2:
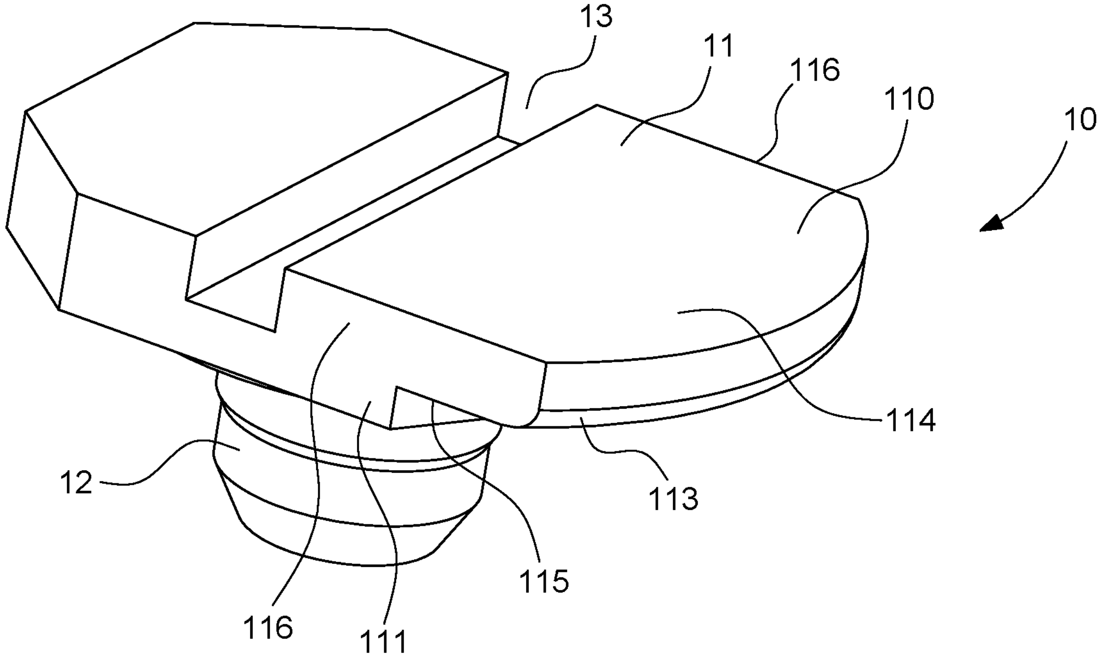
FIG. 2 represents a perspective top view of the bolt of FIG. 1.

Moreover, as represented in FIGS. 1, 2 and 4, the arbor 12 advantageously includes an annular boss 121. Such a boss 121 allows reducing the force necessary for driving the arbor 12 so as to avoid any risk of deformation of the structure 22 of the horological movement 20 when driving the arbor 12. Moreover, this feature has the advantage of reducing the force moment necessary for driving the bolt 10 in rotation, which allows avoiding the risk of shearing the bolt 10 head 11 during its rotation between its blocking and unlocking positions.

Advantageously, the free end of the arbor 12 may include a chamfer 122 in order to allow facilitating fitting of said arbor 12 into the housing 220 of the structure 22 of the horological movement 20, in order to position said bolt 10 for driving thereof.

Moreover, the portion of the arbor 12 comprised between its free end and the boss 121 also allows, thanks to its reduced section in comparison with that of said boss 121, guiding the introduction of said arbor 12 within the housing 220 before driving said bolt 10.

Preferably, the structure 22 of the horological movement 20 includes several housings 220 distributed around the moving body 21, so that the horological movement 20 comprises several bolts 10 respectively housed in said housings 220 and adapted to limit the axial travel of said moving body 21.

More particularly, in one embodiment which is not represented in the figures, the horological movement 20 includes three bolts 10 distributed around the moving body 21, for example formed by an hour wheel.

One of the advantages of the present invention is to allow supplying horological movements with the assembled hour wheel, which avoids the client of said horological movements from having to carry out by himself mounting of said hour wheels in the horological movements.

More generally, it should be noted that the implementations and embodiments considered hereinabove have been described as non-limiting examples, and that other variants could consequently be considered.

The invention claimed is:

1. A bolt (10) configured to limit the axial travel of a moving body (21) of a horological movement (20), said bolt (10) comprising a head (11) arranged at the end of an arbor (12) extending according to a longitudinal axis of revolution, said head (11) extending radially with respect to the arbor (12) and including a radial addendum (110) extending over a portion of a periphery of the head (11), said radial addendum (110) configured to be arranged opposite said moving body (21), and including, at the junction with the arbor (12), a bearing base (111) through which the bolt (10) is configured to rest against a structure (22) of the horological movement (20), the bearing base (111) protruding from a lower surface of the radial addendum (110) along the longitudinal axis of revolution, wherein the base (111) has a central overthickness (112) extending around the arbor (12) so as to allow limiting the bearing surface of said base (111) on the structure (22) of the horological movement (20), and wherein the central overthickness (112) has an axisymmetric cylindrical shape that protrudes from a lower surface of the base (111), the central overthickness (112) having an axis that is coincident with the longitudinal axis of revolution.

2. The bolt (10) according to claim 1, wherein the head (11) includes a relief (13) adapted to cooperate with a tool so as to subject said head (11) to a force moment about the longitudinal axis of the arbor (12).

3. The bolt (10) according to claim 1, wherein the arbor (12) includes an annular groove (120) contiguous to the head (11).

4. The bolt (10) according to claim 1, wherein the arbor (12) includes an annular boss (121).

5. The bolt (10) according to claim 1, wherein the radial addendum (110) includes a chamfer or a fillet (113) intended to face the moving body (21).

6. The bolt (10) according to claim 1, wherein the head (11) includes a planar surface (116) parallel to the longitudinal axis of the arbor (12), configured to be arranged bearing against a bearing surface of the structure (22) of the horological movement (20).

7. The bolt (10) according to claim 1, wherein a free end of the arbor (12) includes a chamfer (122).

8. A horological movement (20) comprising a moving body (21) arranged on a structure (22) of the horological movement (20), said structure (22) comprising a housing (220) in which a bolt (10) according to claim 1 is fitted, so as to be movable in rotation about the longitudinal axis of the arbor (12), between an unlocking position, in which the radial addendum (110) is set back with respect to the moving body (21), and a blocking position in which the radial addendum (110) faces the moving body (21).

9. The horological movement (20) according to claim 8, wherein the bolt (10) is configured so that, when it is arranged in the blocking position, the radial addendum (110) is arranged at a distance from the moving body (21).

10. The horological movement (10) according to claim 8, wherein the structure (22) comprises at least two housings (220) distributed around the moving body (21), in each of which a bolt (10) is fitted.

11. The bolt (10) according to claim 1, wherein, with respect to a plane perpendicular to the longitudinal axis of revolution, a radial length of the central overthickness (112) is less than a radial length of the base (111), and is greater than a radial length of the arbor (12).

* * * * *